C. J. HOLCOMB.
CAR WHEEL.
APPLICATION FILED MAY 16, 1910.
982,179.
Patented Jan. 17, 1911.
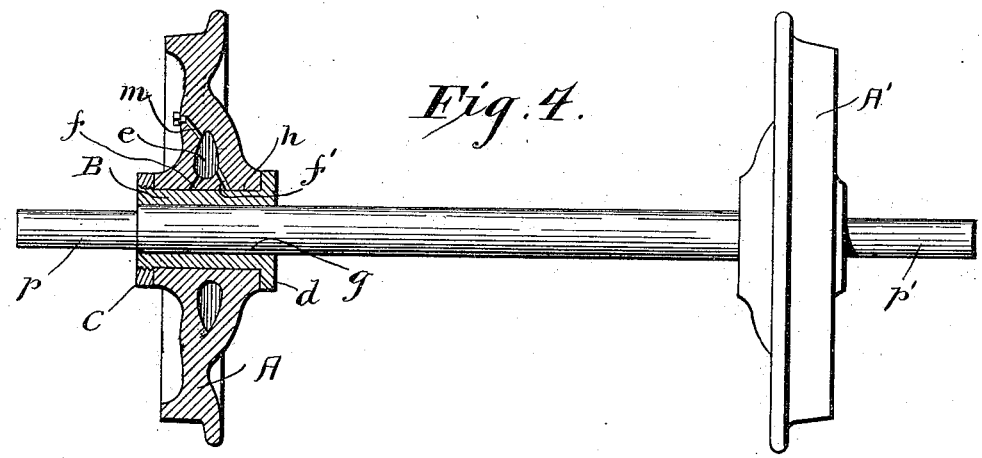
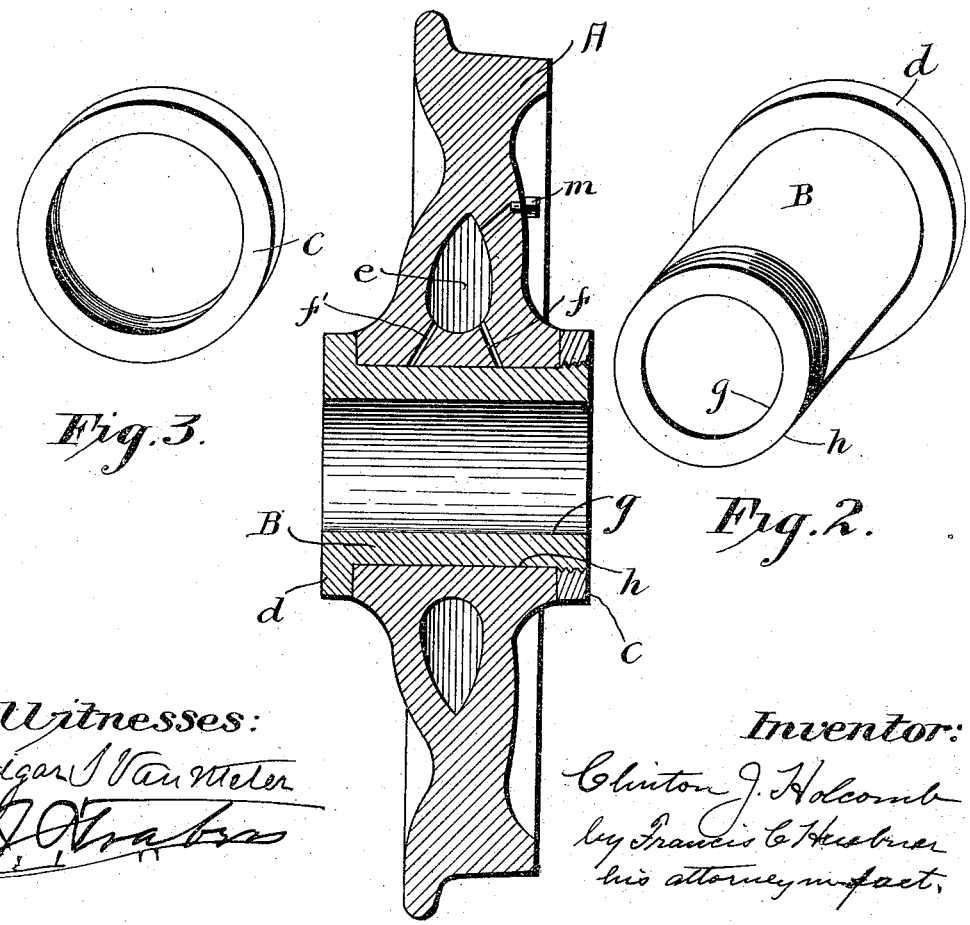

UNITED STATES PATENT OFFICE.

CLINTON J. HOLCOMB, OF FRESNO, CALIFORNIA.

CAR-WHEEL.

982,179.

Specification of Letters Patent. Patented Jan. 17, 1911.

Application filed May 16, 1910. Serial No. 561,725.

*To all whom it may concern:*

Be it known that I, CLINTON J. HOLCOMB, of the city of Fresno, county of Fresno, and State of California, have invented a new and useful Improvement in Car-Wheels, of which the following is a specification.

My invention relates to car wheels and its object is to permit the rotating of the wheels on an axle independently of each other, so that in traveling around a curve one of such wheels can travel at a greater speed than the other and at the same time to maintain rigidity.

My invention consists in the peculiar construction, fittings and combination of the hub of the wheel and the axle, hereinafter more particularly described.

In my drawing Figure 1 represents a transverse view of the car wheel cut through the center at right angles to its face. Fig. 2 is a bushing having a flange. Fig. 3 is a collar which fits on the bushing opposite the end having the flange. Fig. 4 represents the axle with an ordinary car wheel (A′) rigidly fastened at one end thereof, and a wheel of my invention attached to the other end of said axle.

In my construction I make a car wheel as shown in Fig. 1 of the pattern in ordinary use on steam railroads, having hole $h$ for the axle bored larger than the axle. This hole may be tapering or straight. In this hole bushing B (shown also as Fig. 2) is fitted to a running fit and collar C (shown also as Fig. 3) is screwed or pressed on the end of bushing B opposite to the end containing flange $d$. In my construction I prefer to cut the axle hole in the wheel larger at either end so when the bushing B is inserted, the exposed surfaces of flange $d$ and collar $c$ will be flush with the two faces of the wheel. Such exposed surfaces of bushing B can be turned to conform with the contour of the faces of the wheel. In my construction I insert bushing B in axle hole $h$ with the flange on the same side of the wheel on which the flange is on the periphery. This is advisable for the reason that all the pressure on the wheels of a truck is toward the center of the track on which such truck runs.

I have made my wheel with reservoir $e$ which may consist of one large reservoir surrounding the hub, such reservoir to have hole $m$ running from such reservoir to the side faces of the wheel, such hole to be fitted with a plug. The reservoir can be filled with oil through $m$, and through leads $f$ and $f'$ the running surfaces of the hub and bushing can be lubricated. Hole $g$ in bushing B is the exact diameter of the axle and a wheel containing this bushing can be pressed on the axle in the same manner as ordinary car wheels are pressed on and off their axles.

Wheel A as above described is adapted more especially for use on one end only of the axles having bearings at the extreme ends $p$ and $p'$ as shown in Fig. 4. Thus, on a straight track the wheels would run uniformly at the same rate of speed. In going around a curve, however, where one track is longer than the other, wheel A can go slightly faster or slightly slower than wheel A′ (see Fig. 4) depending on whether it has the longer or shorter portion of the track, inasmuch as it can turn on bushing B. This invention will thus eliminate the sliding of wheels on the outside of curves.

As a matter of preference, in constructing a truck containing two or more axles, I alternate wheels A and A′ on the several axles.

What I claim as my invention, and upon which I desire Letters Patent, is:

The combination of an axle D having bearings $p$ and $p'$ at either end thereof, together with independent wheel A consisting of bushing B fitted to a running fit in the axle hole of said wheel A, said bushing having flange $d$ on the same side of the wheel containing the flange on the periphery, and a collar on the other end, said bushing B being pressed upon axle D near one end thereof so as to be capable of removal, substantially as described.

CLINTON J. HOLCOMB.

Witnesses:
 OTTO LOESCHER,
 M. A. BARRICK.